United States Patent [19]

Cho

[11] Patent Number: 4,844,288

[45] Date of Patent: Jul. 4, 1989

[54] REPRODUCTION PICTURE SHARPNESS EMPHASIZING METHOD AND APPARATUS

[75] Inventor: Masamichi Cho, Kyoto, Japan

[73] Assignee: Dainippon Screen Seizo Kabushiki Kaisha, Japan

[21] Appl. No.: 220,427

[22] Filed: Jul. 13, 1988

Related U.S. Application Data

[63] Continuation of Ser. No. 83,894, Aug. 6, 1987, abandoned, which is a continuation of Ser. No. 919,547, Oct. 15, 1986, abandoned, which is a continuation of Ser. No. 573,967, Jan. 26, 1984, abandoned.

[30] Foreign Application Priority Data

Feb. 2, 1983 [JP] Japan ................................. 58-14621

[51] Int. Cl.$^4$ .......................... H04N 1/40; H04N 1/46
[52] U.S. Cl. ..................................... 358/447; 358/75
[58] Field of Search ..................... 358/75, 78, 80, 282, 358/284

[56] References Cited

U.S. PATENT DOCUMENTS

| | | | |
|---|---|---|---|
| 4,237,481 | 12/1980 | Aughton | 358/80 |
| 4,319,268 | 3/1982 | Yamada | 358/75 |
| 4,484,232 | 11/1984 | Gass | 358/284 |
| 4,586,089 | 4/1986 | Nakazato et al. | 358/282 |

FOREIGN PATENT DOCUMENTS

56-8140 1/1981 Japan .

Primary Examiner—James J. Groody
Assistant Examiner—Randall S. Svihla
Attorney, Agent, or Firm—Davis, Bujold & Streck

[57] ABSTRACT

Apparatus for reproducing a scanned picture with sharpness emphasized. A scanner is provided for scanning a picture to be reproduced in two directions perpendicular to one another and for generating and recording signals representing the scanned picture. There is a sharpness emphasizing device for summing and averaging a plurality of picture element signals aligned in one of the scanning directions in the vicinity of a scanning point in the picture being scanned and recorded to generate values and then summing and averaging a plurality of the resulting summed and averages picture signals aligned in the other scanning direction in the vicinity of said scanning point to generate further values and then producing a recording signal equal to $S+k(S-U)$, where k is a constant chosen to enhance a particular characteristic of the scanned picture, S is the sharp signal component at said scanning point and U is a generated unsharp signal. Finally, there is a device for receiving the recording signal and for employing it to reproduce the scanned picture.

10 Claims, 6 Drawing Sheets

REPRODUCTION PICTURE SHARPNESS EMPHASIZING METHOD AND APPARATUS

This is a file-wrapper continuation of application Ser. No. 07/083,894, filed on Aug. 6, 1987, now abandoned, which is a file-wrapper continuation of application Ser. No. 06/919,547, filed on Oct. 15, 1986, now abandoned, which is a file-wrapper continuation of application Ser. No. 06/573,967, filed on Jan. 26, 1984, now abandoned.

BACKGROUND OF THE INVENTION

1. Field of the Invention:

This invention relates to methods and apparatus for emphasizing the sharpness of a picture to be reproduced and/or recorded upon the scanning and recording of the picture by means of a scanner used in plate-making for printing, facsimile transmission, or the like.

2. Description of the Prior Art:

Emphasis of the sharpness of a reproduced picture during picture processing of a scanned image input has heretofore been effected on the picture signals to be processed or on peripheral information related to the picture signals to be processed. When performing sharpness emphasis solely on the basis of processing picture signals, there is a drawback in that the emphasizing effect can be obtained only in the main scanning direction. Thus it is impractical to use such a sharpness emphasizing method in scanners for apparatus making printing plates and the like.

Figure 1:
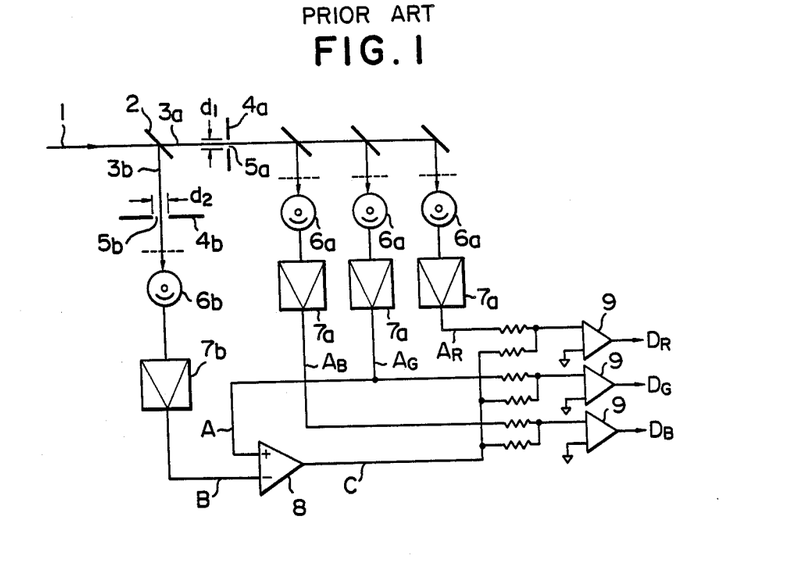
FIG. 1 is a block diagram showing one example of conventional prior art sharpness-emphasizing methods and apparatus.

In the case of conventional methods and apparatus relying upon peripheral information of picture signals to be processed, a light beam 1, which has optically scanned a picture is, as illustrated in FIG. 1, branched by half mirror 2 and the picture is focused on masks 4a, 4b on their corresponding branched axes 3a, 3b. Then, light beams which have passed through apertures 5a, 5b formed through their corresponding masks 4a, 4b and having different aperture diameters $d_1$, $d_2$ are photoelectrically converted by photoelectric conversion elements 6a, 6b and thereafter converted to density signals by means of logarithmic compression amplifiers 7a, 7b, which are equipped with preamplifiers, thereby producing picture signals A, B, respectively.

The light which has passed through the aperture 5a is color-separated into the three colors red (R), green (G), and blue (B), and the resulting color-separated light beams result in, respectively, picture signals $A_R$, $A_G$, and $A_B$, which are referred to as individual sharp signals.

The picture signal A, obtained by way of the smaller aperture diameter $d_1$, is generally called a sharp signal, which is to be subjected to sharpness emphasis. On the other hand, the picture signal B obtained via the larger aperture diameter $d_2$ is generally called an unsharp signal, which is a picture signal containing peripheral information related to the sharp signal A.

Figure 2:
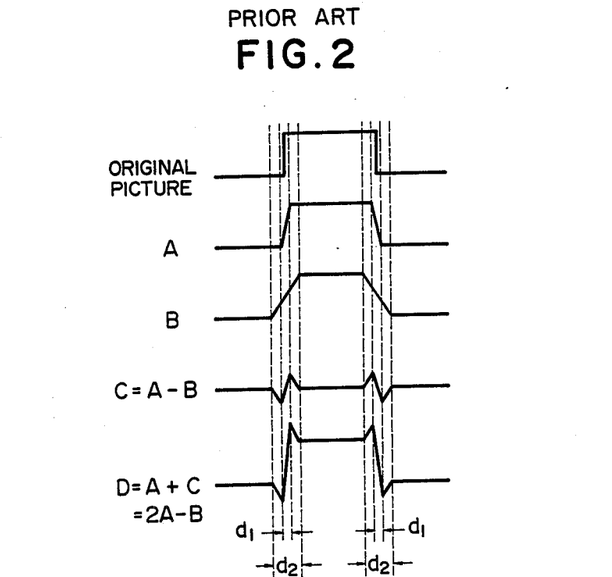
FIG. 2 is a wave-form diagram of part of a signal obtained with the prior art method and apparatus of FIG. 1.

In order to emphasize the sharpness of the recording picture signal by means of the sharp signal A and unsharp signal B, the unsharp signal B is subtracted from the sharp signal A (the green component $A_G$ normally being used for this purpose) by a differential amplifier 8 and unsharp mask signal C output from the differential amplifier 8 is added to the sharp signal A (either $A_R$, $A_G$, or $A_B$) by means of an addition amplifier 9, thereby obtaining as an output of the addition amplifier 9 a light exposed signal D ($D_R$, $D_G$, $D_B$) which has already been emphasized (see FIG. 2).

The above-described sharpness-emphasizing method for picture signals, and its associated apparatus, is widely employed these days but is accompanied by a shortcoming in that it requires an optical system and signal-processing system to convert each density so as to obtain unsharp signals B, in addition to the optical system and signal-processing systems for sharp signals A.

The above sharpness-emphasizing method and apparatus has merit in that the emphasizing characteristic can be made directional by modifying the shape of the aperture 5b used to obtain the unsharp signal B; and, the emphasizing range can be changed by altering the aperture diameter $d_2$. On the other hand, it also has a drawback in that a variety of masks have to be provided corresponding, respectively, to the desired manners of emphasis. Furthermore, the aperture diameter $d_1$ of the aperture 5a for the sharp signal A is determined by the desired resolution of the sharp signal A. Therefore, it is necessary to change the aperture diameter $d_2$ of the aperture 5b whenever the aperture diameter $d_1$ is changed in accordance with the conditions such as magnification of reproduction, etc. Accordingly, it is generally required that the masks 4a, 4b be provided as combined sets associated with various resolutions of the sharp signal A.

One method and associated apparatus which is adapted to emphasize the sharpness of picture signals and has solved the above-described drawbacks of the prior art is disclosed in Japanese patent Laid-open No. #56-8140 of Mitsuhiko Yamada, filed by the present assignee. That method and apparatus is accompanied by a drawback, however, in that certain components or devices required to practice the method (namely, the components or devices corresponding to those indicated by numerals 32–38 in FIG. 4, which will be described hereinafter) become very complex.

Wherefore, it is an object of this invention to provide a sharpness-emphasizing method capable of simplifying the components and/or devices used for its practice yet being similar to the method and apparatus disclosed in the above-recited Japanese patent Laid-open No. #56-8140 and, therefore, an improvement thereto.

SUMMARY OF THE INVENTION;

In one aspect of this invention, there is provided a method and apparatus for emphasizing the sharpness upon scanning and recording a picture according to a method which comprises employing a light-exposing signal according to the formula:

$$S + k(S - U)$$

where

S is a sharp signal of a picture element signal at a scanning point upon scanning and recording the picture;

U is an unsharp signal obtained by summing and averaging a plurality of picture element signals aligned in one of the scanning directions in the vicinity of the scanning point and then summing and averaging a plurality of resulting summed and averaged picture signals aligned in the other scanning direction in the vicinity of the scanning point; and, k is a sharpness emphasizing coefficient.

The above method, and its associated apparatus, of this invention can bring about effects similar to or better than the aforementioned conventional method and apparatus disclosed in Japanese patent Laid-open #56-8140 while permitting use of simpler units or devices for its practice.

The above and other objects, features, and advantages of the present invention will become apparent from the following description and the appended claims, taken in conjunction with the accompanying drawings.

Figure 3:
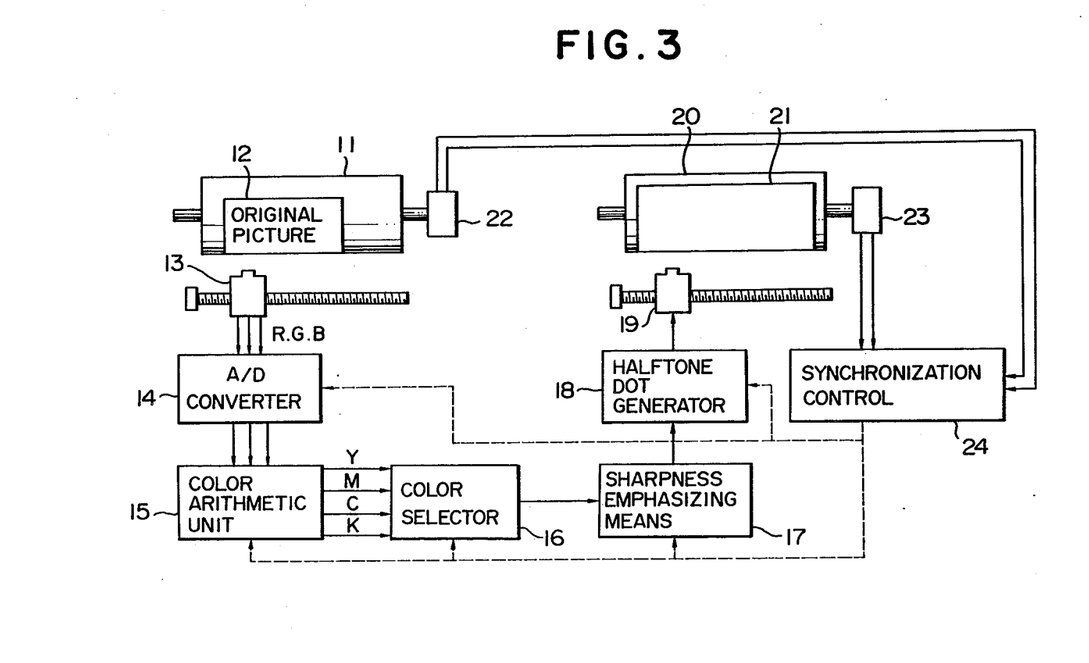
FIG. 3 is a block diagram of a color scanner used in the practice of the present invention.

DETAILED DESCRIPTION OF THE INVENTION AND PREFERRED EMBODIMENTS:

FIG. 3 is a block diagram showing one example of a drum-scanning digital color scanner as used in the practice of the method according to this invention. Picture information, which is contained in original picture 12 wrapped over an original picture drum 11, is scanned by a light-receiving head 13, separated into the three colors red (R), green (G), and blue (B), and then photoelectrically converted into three corresponding analog color signals. The three color signals from the head 13 are converted by A/D converter 14 into their corresponding digital color signals. Alternatively, the A/D converter 14 can be omitted at this point and the color signals maintained as analog signals. In either case, the color signals are thereafter subjected to masking or color correction processing or color tone or gradation control at a color arithmetic unit 15 (being either digital or analog as appropriate) so that they are converted, respectively, to the usual color separation signals yellow (Y), magenta (M), cyan (C), and black (K). Note that when the resulting color separation signals are still analog signals at this point, the thus-obtained analog color separation signals are then fed through an A/D converter (such as 14) so as to convert them into equivalent digital signals for further processing.

Signals which are intended to be reproduced, are selected from the thus-obtained color separation signals at color selector 16 which performs magnification-changing processing, simultaneous multi-colored output processing, or single-colored output processing), and are then subjected to sharpness-emphasizing processing at sharpness emphasizing means 17, which will be described hereinafter. Then, the resulting signals are fed through half-tone dot generator 18 onto a photosensitive material 21 wrapped over light-exposing drum 20 which is exposed by means of light-exposing head 19.

The above-described digital circuits are all controlled synchronously by a picture element clock pulse, main-scanning pulse, or the like, which is produced by timing pulses input to synchronization controller 24 from rotary encoders 22, 23 from, respectively, the original picture drum 11 and the light-exposing drum 20 and output from the synchronization controller 24 as indicated by the dotted arrow lines.

Figure 4:
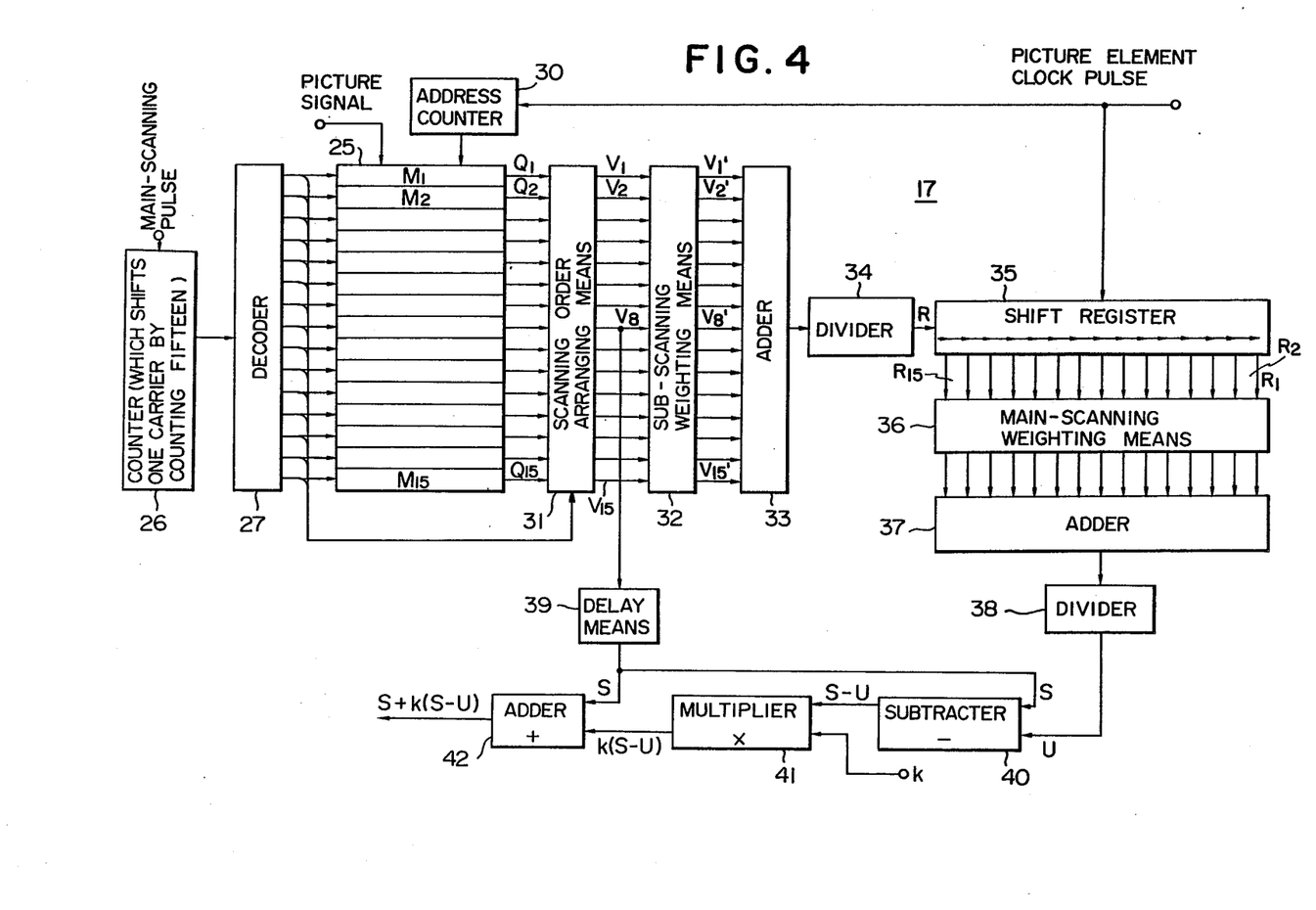
FIG. 4 is a block diagram of the sharpness-emphasizing system of the scanner of FIG. 3.

FIG. 4 is a block diagram showing the details of the sharpness-emphasizing means 17 of the present invention, in which numeral 25 indicates a picture memory adapted to store accumulated density information for densities in the vicinity of the scanning point. Picture memory 25 is composed of memory blocks $M_1$-$M_{15}$, each of which is capable of storing picture signals output from the color selector 16 over one scanning line. Additionally, the picture memory 25 has a capacity equivalent to fifteen scanning lines. Picture signals are successively written into the picture memory 25 in the order of scanning by means of counter 26 (which shifts by one carrier after 15 signals have been input) and a decoder 27. The picture signals at each memory block $M_1$-$M_{15}$ are, therefore, overwritten with fresh picture signals on every fifteenth scanning line in a manner well known to those skilled in the art.

Figure 5:
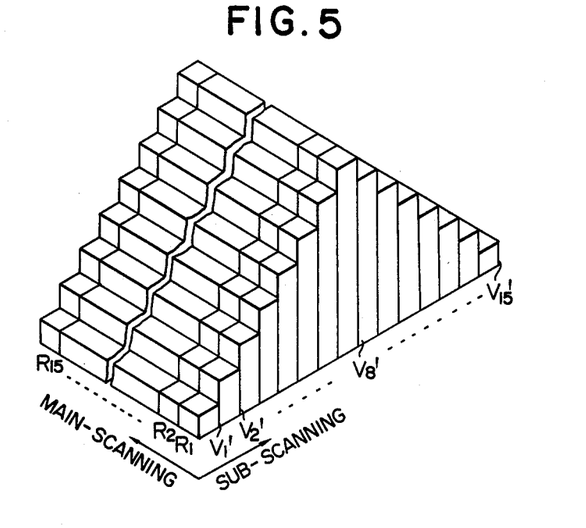
FIG. 5 is a drawing schematically illustrating signals not sharply defined in the sub-scanning direction.

The picture element clock pulse output from the synchronization controller 24 of FIG. 3 is input to address counter 30. The picture memory 25 is controlled by the value of the output from the address counter 30 so that picture signals are sequentially written into the picture memory 25 and, simultaneously, also delivered to scanning order arranging means 31. At each processing step, fifteen picture signals which have, in advance, been written into and correspond to the same positions in the main-scanning direction are read out from the picture memory 25 and sent to the scanning order arranging means 31. In this manner, fifteen picture signals $Q_1, \ldots, Q_{15}$ corresponding to the same position in the main-scanning direction are input to the scanning order arranging means 31, where the picture signals $Q_1, \ldots, Q_{15}$ which have not been arranged in the order of their input are rearranged in the order of their corresponding scanning lines in accordance with the information from the decoder 27. Thereafter, the thus-rearranged picture signals $V_1, \ldots, V_{15}$ are output from the scanning order arranging means 31 to the sub-scanning weighting means 32. The picture signals $V_1, \ldots, V_{15}$ from the scanning order arranging means 31 (see FIG. 7) are respectively multiplied by pre-determined coefficients and thus weighted to form signals $V'_1, \ldots, V'_{15}$ by the sub-scanning weighting means 32. Then, the resulting signals are converted to a single signal R at adder 33 and divider 34. The thus-obtained sub-scanning direction signals $R_1, \ldots, R_{15}$, which correspond respectively to the fifteen picture elements in the main-scanning direction, are input one after another to the shift register 35. FIG. 5 illustrates by way of example picture signals contained in shift register 35.

Figure 6:
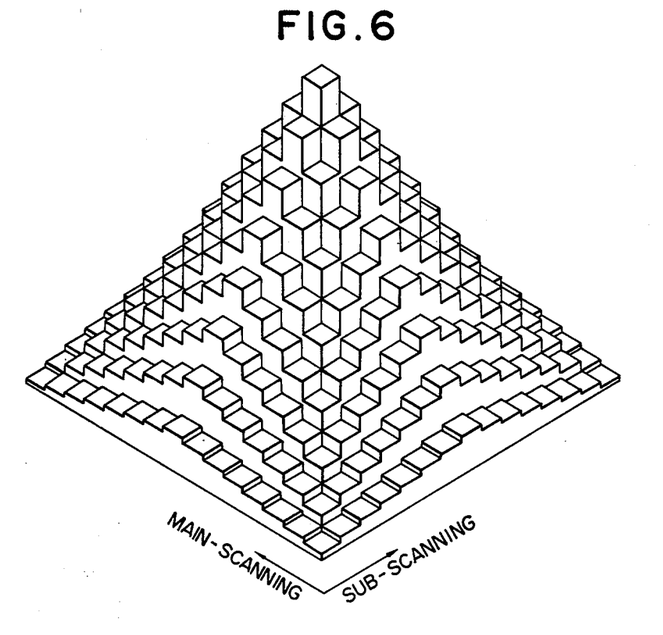
FIG. 6 is a drawing schematically illustrating signals not sharply defined in both sub-scanning and main-scanning directions; and, FIGS. 7 and 8 are block diagrams of systems employed in the present invention for producing unsharp signals with a reduced number of components.

Signals which have been output from the shift register 35 and have already been weighted as shown in FIG. 5 are converted by means of a main-scanning weighted means 36, adder 37, and divider 38 to unsharp signals U which are weighted as illustrated in FIG. 6 and are not sharply defined in the main-scanning direction. The resulting unsharp signals U are output from the divider 38.

The central signal, $V_8$, out of the signals sent from the scanning order arranging means 31 is caused to pass through a delay means 39 which serves to delay each signal by a time period equal to the unsharpness processing time; i.e., from the sub-scanning weighting means 32 to the divider 38, whereby the central signal $V_8$ is converted to a well-defined sharp signal S which corresponds in time to the above-described unsharp signal U. Both of the above-described signals S, U are input to subtracter 40 and the difference output therefrom is then multiplied by a suitable sharpness-emphasizing coefficient, k, by multiplier 41, and the output therefrom thereafter added with the sharp signal S by adder 42 the output of which is a high-quality light-exposing signal $S+k(S-U)$, the contour of which has been emphasized.

Figure 7:
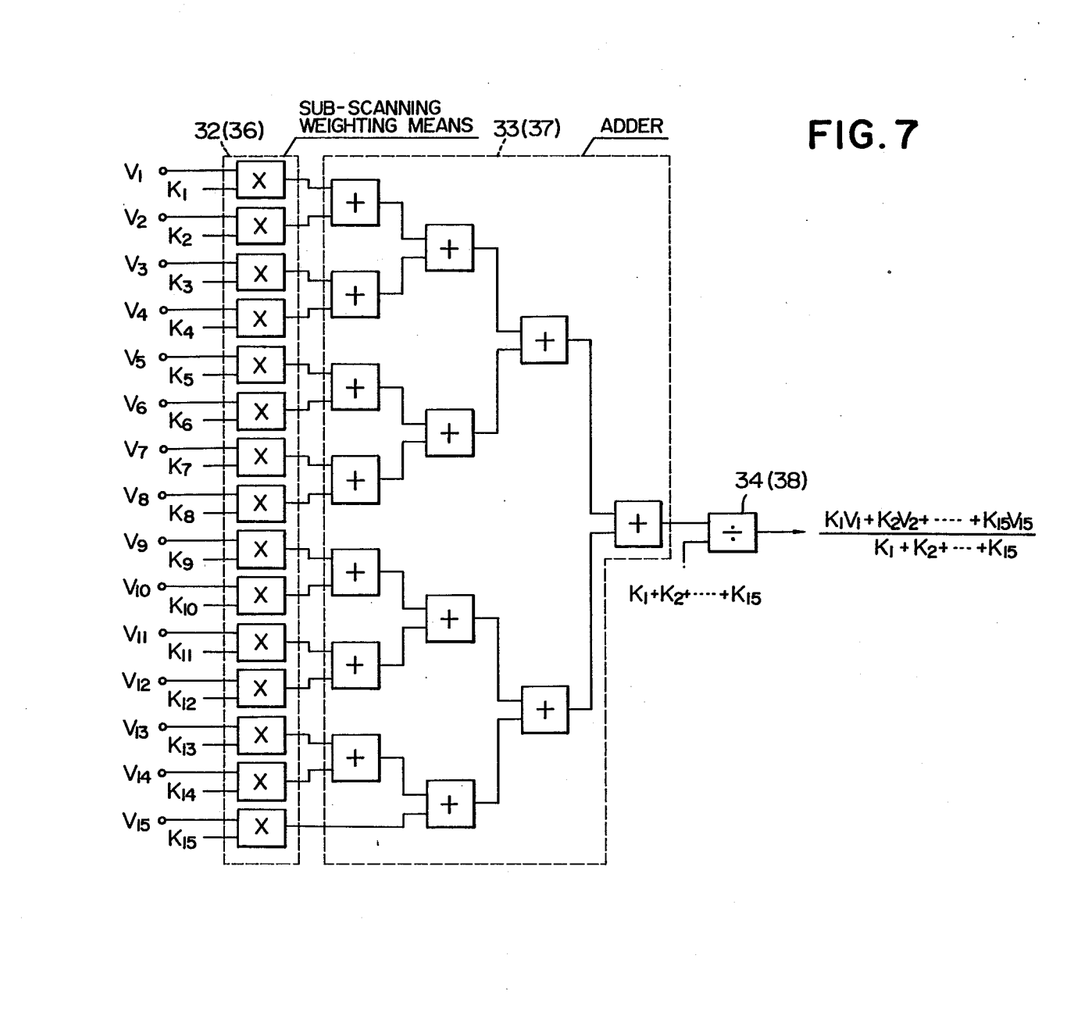

FIG. 7, referred to earlier, illustrates an example of the weighting means 32, adder 33, divider 34, weighting means 36, adder 37 and divider 38 of FIG. 4 according to the present invention.

In the weighting means 32, 36, the signals $V_1, \ldots, V_{15}$ and $R_1, \ldots, R_{15}$ are multiplied, respectively, by coefficients $k_1, \ldots, k_{15}$ and $k'_1, \ldots, k'_{15}$. The resulting signals are added by the subsequent adders 33, 37 and then averaged respectively at the dividers 34, 38.

Figure 8:
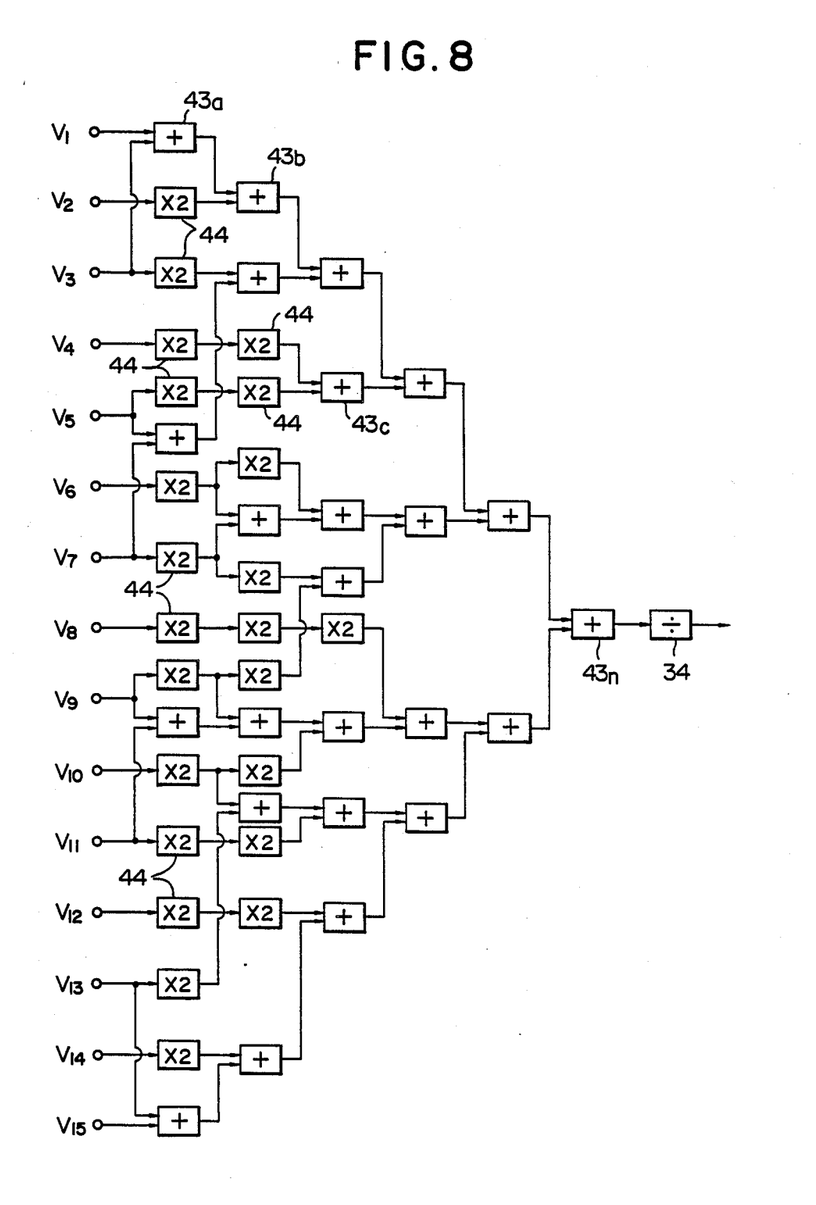

FIG. 8 illustrates a special example of the unsharp signal producing system of FIG. 7. In this special example, the coefficient $k_1, \ldots, k_{15}$ are given respectively as 1, 2, 3, 4, 5, 6, 7, 8, 7, 6, 5, 4, 3, 2, and 1. In the circuit of FIG. 8, both the doublers 44 and divider 34 can be constructed with simple circuits well known in the art. The divider 34 is designed in such a way that the total of the coefficients $k_1, \ldots, k_{15}$ is 64 and information data can be processed in the binary scale of notation. Therefore, a division by 64 can be performed by shifting all bits downwardly by six bits (namely, by effecting a connection of wires to shift by six bits) since $2^6 = 64$.

In like manner, doublers 44 can perform their functions by shifting binary-coded information data upwardly by one bit. Where the data entering the divider 34 are the greatest, adders 43 are each required to be fourteen bits. In order to handle each data in eight bits, it is only necessary to convert the doublers 44 into a singler and to shift eight bits=nine bits (max.) by shifting one bit downwardly. If the result from each adder 43 is multiplied by one-half, each adder 43 may be of eight bits only and the divider 34 may be a singler; that is, the divider 34 is unnecessary, but may be substituted for a singler, thereby simplifying the system.

The present invention has brought about the following additional advantageous possibilities. If the weighting is not applied, i.e., $k_1, \ldots, k_{15}=1$ in Fig. 7, the circuit becomes even simpler. The dividers 34, 38 perform a divide by 15.

By using a memory, or the like, (RAM, ROM, or the like) as the multiplier 41 in FIG. 4 so as to perform the multiplication by means of a lookup table in a manner well known in the art, it is possible to access the coefficient k as a function of the value of (S−U) and, hence, to perform more effective sharpness emphasis. Similarly, a coefficient k may be set for each color plate to be exposed to light. The emphasis of sharpness can be performed more effectively if the number of picture element signals in the main-scanning and sub-scanning directions, which signals are employed to obtain the unsharp signal U are made different from each other.

Still more effective sharpness emphasis can be carried out if two or more sharpness-emphasizing means 17 are provided, and two or more kinds of numbers of picture element signals (although fifteen signals are employed in the above-described embodiment) are used in each of the scanning directions. In such case, the light-exposing signal is according to the formula $S+k_1(S-U1)+k_2(-S-U2)+\ldots$ is used, supposing the resulting averaged signals to be the unsharp signals $U_1, U_2, \ldots$ and their coefficients to be $k_1, k_2, \ldots$.

In FIGS. 7 and 8, every second signal may be used, for example, $V_1, V_3, V_5, V_7, \ldots, V_{15}$ in order to make the circuit simpler. After weighting the signals respectively to $V'_1, V'_3, V'_5, V'_7, \ldots, V'_{15}$, the resulting weighted signals are converted to a single signal R by means of the adder 33 and divider 34. Supposing that the signal R can be obtained with respect to each of the fifteen picture elements in the sub-scanning direction, sub-scanning direction signals $R_1, R_2, \ldots, R_{15}$ are obtained. The sub-scanning direction signals are then input successively to the shift register 35. Thereafter, among the signals being output from the shift register 35, signals $R_1, R_3, R_5, \ldots, R_{15}$ are caused to pass through the main-scanning weighting means 36, adder 37, and divider 38, thereby obtaining the unsharp signal U. It is, of course, possible to form an unsharp signal based on even fewer signals.

When employing multi-colored signals in the prior art, it has been standard practice in emphasizing the sharpness, to obtain the sharp signal S and the unsharp signal U and then supply sharpness-emphasizing signals in the manner illustrated in FIG 1. The present invention is capable of performing sharpness-emphasis of each individual color by means of the sharpness-emphasizing means 17 even when light exposure is effected color by color, while still enjoying the benefit over the prior art of omitting the optical system used in the prior art for obtaining the unsharp signals. In an alternate approach, the photosensitive material 21 may be simultaneously exposed to a plurality of colors, each having been emphasized in sharpness, by providing a plurality of sharpness-emphasizing means 17. In another alternative, by inputting signals which have been read out in the order of the colors to the sharpness-emphasizing means 17 during one main-scanning time period, it is possible to emphasize the sharpness of each of the colors in the course of the main-scanning time period.

It should also be recognized and appreciated by those skilled in the art that it is also possible to perform the emphasis of sharpness in accordance with a light-exposing signal $S+k_M(S_M-U_M)=k_C(S_C-U_C)$, obtained by using an unsharp signal which has, in turn, been obtained from obtained G (green) or M (magenta) and R (red) or C (cyan).

It is also possible to perform effective sharpness-emphasis by employing, as a light-exposing signal, $S+k^+(S-U)^+ + k^-(S-U)^-$, which has been obtained by taking out the outputs of the subtracter 40 separately depending on whether the outputs are positive, i.e., $(S-U)^+ > 0$ or negative, i.e., $(S-U)^- < 0$ and supposing their coefficient to be $k^+$ and $k^-$, respectively.

Under certain given conditions, one may want to increase or decrease the emphasis of sharpness of a certain hue. In this case, the sharpness emphasis can be effectively performed according to the present invention if the coefficient k is controlled under the given conditions. Furthermore, it is also feasible, for example, to control the coefficient k by designating certain points on an original.

While not shown in the figures, it is possible, of course, to employ the present invention to reproduce a picture, which has been emphasized in sharpness, on a photosensitive material by scanning an original picture laid on a plane with a laser beam by means of polygon mirror, or the like, in a manner well known in the art, photoelectrically converting the resulting reflected or transmitted light, and then processing the thus-obtained picture signals in the same manner as in the above-described drum scanner.

Needless to say, the above-described method and apparatus of this invention can also be applied to any other scanning systems including television sets, and the like, as well as to monochromatic color.

Having now fully described the invention, it will be apparent to one of ordinary skill in the art that many changes and modifications can be made thereto without departing from the spirit or scope of the invention as set forth herein.

What is claimed is:

1. An apparatus for reproducing a picture with enhanced sharpness, comprising:
    means for generating a sharp signal S for each of a plurality of pixels of a picture to be reproduced by scanning the picture in two perpendicular scanning directions;
    means for generating an average signal R for a pixel being scanned by averaging a plurality of sharp signals corresponding to a group of pixels in the vicinity of the pixel being scanned, wherein the pixels in the group are successively disposed in one of the two scanning directions;
    means for generating an unsharp signal U for the pixel being scanned by averaging a plurality of average signals R corresponding to a plurality of groups of pixels in the vicinity of the pixel being scanned, wherein the groups of pixels are successively disposed in the other of the two scanning directions;
    means for generating a recording signal of the form $S+k(S-U)$, wherein k is a constant chosen to provide a desired degree of sharpness enhancement and S is the sharp signal for the pixel being scanned; and
    means for reproducing the picture in accordance with the recording signal.

2. The apparatus of claim 1, wherein the number of pixels in each group of pixels is smaller than the number of groups in the plurality of groups of pixels.

3. The apparatus of claim 1, wherein the number of groups in the plurality of groups of pixels is smaller than the number of pixels in each group of pixels.

4. The apparatus of claim 1, wherein sharp signals S corresponding to certain ones of the pixels in each group of pixels are not used in generating the corresponding average signal R, and wherein average signals R corresponding to certain ones of the groups in the plurality of groups of pixels are not used in generating the unsharp signal U.

5. Apparatus for reproducing a scanned picture with sharpness emphasized comprising:
    (a) means for generating a sharp signal S for each of a plurality of pixels of a picture to be reproduced by scanning the picture in two directions perpendicular to one another;
    (b) memory means for storing a plurality of sharp signals corresponding to a group of pixels in the vicinity of a pixel being scanned and for updating the stored sharp signals when a succeeding pixel is being scanned, wherein the pixels in the group are successively disposed in both of the two scanning directions;
    (c) arranging means connected to said memory means for arranging in sequential order and outputting a plurality of stored sharp signals corresponding to a group of pixels which are successively disposed in one of the two scanning directions;
    (d) first averaging means connected to said arranging means for averaging said arranged sharp signals to produce an average signal R for the pixel being scanned;
    (e) second averaging means connected to said first averaging means for averaging a plurality of average signals R corresponding to a plurality of groups of pixels in the vicinity of the pixel being scanned to produce an unsharp signal U for the pixel being scanned, wherein the groups of pixels are successively disposed in the other of the two scanning directions;
    (f) subtracter means connected for generating a signal of the form $S-U$, where S is the sharp signal and U is the unsharp signal for the pixel being scanned;
    (g) multiplier means connected for generating a signal of the form $k(S-U)$, where k is a constant chosen to provide a desired degree of sharpness enhancement;
    (h) adder means connected for generating a recording signal of the form $S+k(S-U)$; and,
    (i) means for reproducing the picture in accordance with said recording signal.

6. The apparatus of claim 5 wherein:
    the number of pixels in each group of pixels is smaller than the number of groups in the plurality of groups of pixels.

7. The apparatus of claim 5 wherein:
    the number of groups in plurality of groups of pixels is smaller than the number of pixels in each group of pixels.

8. The apparatus of claim 5 wherein:
    sharp signals S corresponding to certain ones of the pixels in each group of pixels are not used in generating the corresponding average signal R, and wherein average signals R corresponding to certain ones of the groups in the plurality of groups of pixels are not used in generating the unsharp signal U.

9. In an apparatus for reproducing a scanned picture with sharpness emphasized including means for scanning a picture to be reproduced in two directions perpendicular to one another and for generating a sharp signal S for each of a plurality of pixels of the picture, sharpness emphasizing means for generating a recording signal as a function of a sharp signal S and an unsharp signal U, and means for reproducing the picture in accordance with said recording signal, the improvement for reducing the number of components required for the sharpness emphasizing means comprising:
    (a) means for generating an average signal R for a pixel being scanned by averaging a plurality of sharp signals corresponding to a group of pixels in the vicinity of the pixel being scanned, wherein the pixels in the group are successively disposed in one of the two scanning directions;
    (b) means for generating an unsharp signal U for the pixel being scanned by averaging a plurality of average signals R corresponding to a plurality of groups of pixels in the vicinity of the pixel being scanned, wherein the groups of pixels are successively disposed in the other of the two scanning directions; and (c) means for generating a recording signal of the form $S+k(S-U)$, where k is a constant chosen to provide a desired degree of sharpness enhancement and S is the sharp signal for the pixel being scanned.

10. In a method for reproducing a scanned picture with sharpness emphasized by scanning a picture to be reproduced in two directions perpendicular to one another and generating a sharp signal S for each of a plurality of pixels of the picture, performing sharpness emphasizing by generating a recording signal as a function of a sharp signal S and an unsharp signal U, and reproducing the picture in accordance with said recording signal, the method of performing sharpness emphasizing which will reduce the number of components required to perform the sharpness emphasizing comprising the steps of:

(a) generating an average signal R for a pixel being scanned by averaging a plurality of sharp signals corresponding to a group of pixels in the vicinity of the pixel being scanned, wherein the pixels in the group are successively disposed in one of the two scanning directions;

(b) generating an unsharp signal U for the pixel being scanned by averaging a plurality of average signals R corresponding to a plurality of groups of pixels in the vicinity of the pixel being scanned, wherein the groups of pixels are successively disposed in the other of the two scanning directions; and (c) generating a recording signal of the form $3+k(S-U)$, where k is a constant chosen to provide a desired degree of sharpness enhancement and S is the sharp signal for the pixel being scanned.

* * * * *